United States Patent [19]

Hoppe et al.

[11] Patent Number: 5,362,313
[45] Date of Patent: Nov. 8, 1994

[54] COATING COMPOSITION AND ITS USE

[75] Inventors: Lutz Hoppe; Burkhard Kressdorf, both of Walsrode; Erhard Lühmann, Bomlitz; Reinhard Näder, Walsrode, all of Germany

[73] Assignee: Wolff Walsrode AG, Walsrode, Germany

[21] Appl. No.: 152,954

[22] Filed: Nov. 15, 1993

Related U.S. Application Data

[63] Continuation of Ser. No. 911,563, Jul. 7, 1992, abandoned, which is a continuation of Ser. No. 746,394, Aug. 16, 1991, abandoned.

[30] Foreign Application Priority Data

Aug. 24, 1990 [DE] Germany .............. 4026701

[51] Int. Cl.$^5$ .......................... C09D 101/18
[52] U.S. Cl. ...................... 106/171; 106/195
[58] Field of Search ................ 106/171, 195

[56] References Cited

U.S. PATENT DOCUMENTS

| | | |
|---|---|---|
| 2,556,145 | 6/1951 | Niederhauser . |
| 2,559,177 | 7/1951 | Terry et al. . |
| 2,963,455 | 12/1960 | Rowland et al. .......... 106/171 |
| 3,003,978 | 10/1961 | Coney et al. ............ 106/171 |
| 4,517,324 | 5/1985 | Lühmann et al. ........... 524/27 |
| 4,681,784 | 7/1987 | Ebara et al. ............. 524/30 |
| 4,731,121 | 3/1988 | Lühmann et al. ........... 106/181 |

OTHER PUBLICATIONS 83-709536, Database WPIL, & SU-954408 Derwent Pub. Aug. 1982.
"High Solids Nitrocellulose Lacquers for Furniture Finishing", Hercules Powder Co., Mar. 1947, pp. 14, 15, 18, 28.

Primary Examiner—David Brunsman
Attorney, Agent, or Firm—Sprung Horn Kramer & Woods

[57] ABSTRACT

This invention relates to a new solid lacquer binder comprising gelatinized nitrocellulose, useful for the preparation of blocking-resistant coating compositions comprising epoxidized natural fatty acids of epoxidized triglycerides.

5 Claims, 1 Drawing Sheet

COATING COMPOSITION AND ITS USE

This application is a continuation of application Ser. No. 07/911,563, filed Jul. 7, 1992, now abandoned which is a continuation in part of Ser. No. 07/746,394 filed Aug. 16, 1991 now abandoned.

This invention relates to a new solid lacquer binder comprising gelatinized nitrocellulose, useful for the preparation of blocking-resistant coating compositions.

In the lacguering of flexible substrates (for example films of all kinds), production capacity can be increased inter alia by raising the drying temperature. However, this increase in temperture is limited by the thermoplastic behavior of the coating materials. Accordingly, there is a need for coating compositions which enable the drying temperature to be increased without problems arising during application, for example in regard to blocking resistance.

For example, it is known that coating compositions based on OH-functional polyesters or acrylates, isocyanates and cellulose nitrate are used for the production of sealable, printed aluminium foils for the packaging of foods and pharmaceutical products. Problems arise in this production process on account of the inadequate blocking resistance of the coating compositions.

In general, adhesive strength, thermoformability and processing properties are considerably improved by the incorporation of cellulose nitrates.

It is now a legal requirement that a desensitizer (for example a damping agent) must be added to commercially available lacquer-quality cellulose nitrates.

Alcohols, such as ethanol, isopropanol or butanol for example, are generally used as damping agents. These damping agents lead to considerable problems during the processing of lacquers containing them because alcohols such as these cause problems in the usual adsorption units which follow lacquering plants for emission control. In addition, when used in PUR (polyurethane) lacquers, the alcohols are capable of reacting with the isocyanate to form low molecular weight compounds, thus diminishing the property profile of the lacquers.

Instead of these solvents, however, plasticizers of the type described in DE-PS 1 203 652 and in DE-OS 1 470 860 and 1 570 121 may also be used as desensitizers for cellulose nitrate. The plasticizers are applied to the water-wet cellulose nitrate and are then mechanically incorporated therein, preferably at relatively high temperatures (>50° C.). The water is then squeezed off and the material is dried (DE-PS 1 203 652). Another method is to apply plasticizers in solvents (DE-OSS 147 860 and 1 570 121).

According to these publications, phthalates, such as dibutyl phthalate or dioctyl phthalate for example, are exclusively used in a quantity of at least 18% by weight. Although it is possible by using cellulose nitrates desensitized in this way specifically to select the solvents in the lacquer formulation, the coating does contain plasticizers which diminish the special properties required, for example of aluminium foils. Thus, in the production of printed aluminium foils for the packaging of foods or pharmaceutical products, the reactive overprint lacquer containing cellulose nitrate is applied after a primer and the printing ink, dried at around 200° C. and then provided with a sealing lacquer on the uncoated side of the foil. To improve flow and to accelerate drying, the printed side of the aluminium foil is passed over heated rollers which can have a surface temperature of up to 240° C. Problems arise in this method of production through the tendency of the overprint lacquer in contact with the hot roller surface towards blocking, sticking and yellowing.

The problem addressed by the present invention was to provide a lacquer binder comprising an anhydrous cellulose nitrate/plasticizer mixture which could be used to prepare lacquers that would show improved blocking resistance in relation to the known cellulose nitrate/plasticizer mixtures.

It has surprisingly been found that the stated problem can be solved by the use of solid lacquer binders comprising gelatinized nitrocellulose. The gelatinized nitrocellulose of the present invention is an anhydrous plasticizer/cellulose nitrate mixture in which the plasticizer is chemically modified by epoxidation and/or ethoxylation.

Accordingly, the present invention relates to solid lacquer binders consisting essentially of cellulose nitrate having a nitrogen content of less than 12.6% by weight and epoxidized and/or ethoxylated esters of natural fatty acids and/or epoxidized and/or ethoxylated triglycerides.

Commercially available cellulose nitrates differing in their viscosities for a nitrogen content of 10 to 12.6% by weight are preferably used for the production of the cellulose nitrate/plasticizer mixtures according to the invention.

Preferred lacquer binders are those which consist of 82 to 40% by weight and preferably 82 to 60% by weight cellulose nitrate and 18 to 60% by weight and preferably 18 to 40% by weight epoxidized and/or ethoxylated esters of natural fatty acids and/or epoxidized and/or ethoxylated triglycerides.

The epoxidized plasticizers are, in particular, epoxidized esters of natural fatty acids and epoxidized triglycerides. The high molecular weight epoxy plasticizers of epoxidized triglycerides are preferred, particular preference being attributed to the epoxidized plasticizers of natural fatty acid triglycerides which contain a significant number of unsaturated double bonds (iodine value 120 to 200), for example epoxidized soybean oil or linseed oil having a molecular weight of approximately 900 and an oxirane content of >6%.

The epoxidized plasticizers are, in particular, epoxidized esters of natural fatty acids. The high molecular weight epoxy plasticizers of epoxidized triglycerides are preferred, particular preference being attributed to the epoxy plasticizers of natural fatty acid triglycerides which contain a significant number of unsaturated double bonds (iodine value >120).

Examples of suitable esters are diisodecyl tetrahydroepoxyphthalate, di-2-ethyl hexyl tetrahydroepoxyphthalate, alkyl epoxystearates, for example octyl epoxystearate, cycloalkyl epoxystearates, for example cyclohexyl epoxystearate, alkyl epoxyoleates, for example butyl and octyl epoxyoleate, cycloalkyl epoxyoleates, for example cyclohexyl epoxystearate, epoxidized polyglycol fatty acid esters, alkyl epoxyricinoleates, alkyl esters of epoxidized cottonseed oil and soybean oil fatty acids, epoxidized cottonseed oil, epoxidized sunflower oil, epoxidized castor oil, epoxidized palm oil, epoxidized soybean oil, epoxidized linseed oil, epoxidized wood oil, epoxidized tall oil, epoxidized sunflower oil, epoxidized sesame oil. Epoxidized soybean oil having an oxirane content of >6% is particularly preferred.

The ethoxylated plasticizers are ethoxylated esters of natural fatty acids and hydrogenation products thereof, more particularly ethoxylated triglycerides. High molecular weight ethoxylated triglycerides are preferred, particular preference being attributed to ethoxylation products of natural fatty acid triglycerides containing a significant number of unsaturated double bonds (iodine value 60 to 200), for example castor oil containing 2 to 20 mol ethylene oxide per mol and, more particularly, 2 to 8 mol ethylene oxide per mol.

In addition to the plasticizers or plasticizer mixtures to be used in accordance with the invention, other desensitizers may also be used to a limited extent, for example to improve the low-temperature resistance of coatings.

In one preferred embodiment, the mixtures according to the invention contain at least 18% by weight and, more particularly, 18 to 40% by weight, based on the total weight, of the epoxidized or ethoxylated plasticizer. If other components are added to the plasticizer, they are preferably used in a quantity of 0 to 5% by weight, based on the mixture as a whole. Where a mixture of desensitizers such as this is used, the total desensitizer content is preferably 18 to 45% by weight.

The plasticizer or mixtures of the plasticizer and additional desensitizer are incorporated by any of the methods normally used for the production of plasticizer/cellulose nitrate mixtures, for example by spraying, optionally in emulsion form, onto the water-wet cellulose nitrate in a continuous push-type centrifuge or in a conventional kneading or stirring unit.

The present invention also relates to the use of the lacquer binders as an ingredient of lacquers for lacquering rigid and flexible substrates and preferably for the production of lacquers for lacquering flexible substrates which are required to show high blocking resistance, particularly polyurethane lacquers.

In the context of the invention, flexible substrates are understood to be flat materials, such as for example aluminium, cellophane, polyamide, polyester, polypropylene, polyurethane and polycarbonate films or resin-impregnated papers. Depending on the method of application and the requirement profile, the coating compositions according to the invention may be formulated with other lacquer ingredients to form lacquers.

The invention is illustrated by the following Examples.

EXAMPLES

18% by weight of the following plasticizers are applied to cellulose nitrate of the standard E 24 type (wetted with 35% water) by the method described in DE 1 203 652:
  dioctyl phthalate (comparison),
  epoxidized soybean oil,
  epoxidized linseed oil,
  ethoxylated castor oil containing on average 4 mol ethylene oxide per mol.

Using these lacquer binders, the tendency of pure cellulose nitrate/plasticizer films and of PUR films containing cellulose nitrate towards blocking was determined. An FEK-VESLIC rub fastness tester (Kueny-Maschinenbau, Münchenstein, Switzerland) comprising a heating stamp was used to apply heat to the coated surface. A glass plate was clamped in this test arrangement together with the film to be investigated with a paper web on top which was attached to the underneath of the glass plate. A heatable 500 g stamp of V4A steel with a base area of 15×15 mm and rounded edges (edge radius 1 mm), which had been heated to the desired test temperature, was then placed on the paper web. An additional weight of 500 g was applied to the stamp which was then moved back and forth. The stamp was moved across the paper 200 times over a rubbing distance of 40 mm at a frequency of 40±2 cycles/minute. After this thermal and mechanical treatment, the coated surface was evaluated on a scale of 1 to 6:
  1: no visible change in the lacquer surface
  2: surface visibly changed without fibers
  3: surface visibly changed with individual fibers
  4: surface one-third covered with fibers
  5: surface two-thirds covered with fibers
  6: surface completely covered with fibers

EXAMPLE 1

Figure 1:
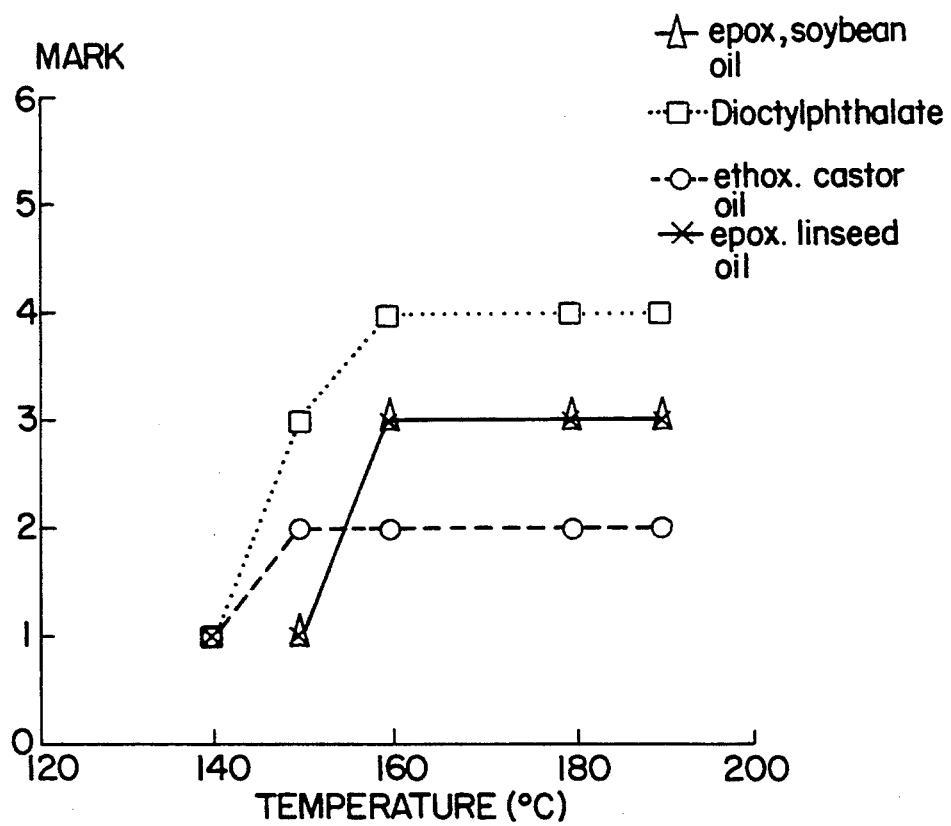
FIGS. 1 and 2 plot the evaluation of the surface vs. temperature for Examples 1 and 2.

The solid lacquer binders were dissolved in ethyl acetate to form 20% solutions. The solutions were applied to glass plates with a 30 μm box knife coater. The coated surfaces were dried for 2 h at room temperature and for 30 minutes at 50° C. and then tested in the test arrangement described above. The temperatures were varied between 140° and 200° C. The results are shown in FIG. 1.

Dioctyl Phthalate

Beyond 140° C., the tendency of the coated surface to block increases considerably, reaching a maximum at 160° C. with one third of the surface covered with fibers.

Epoxidized Soybean Oil

A change in the surface only occurs beyond 160° C., i.e. 20° C. later than in the case of dioctyl phthalate. This is a significant advantage in terms of processing. Even at temperatures above 160° C., the tendency of the surface towards blocking is lower than in the case of dioctyl phthalate.

Epoxidized Linseed Oil

The measured values are identical with those of epoxidized soybean oil.

Ethoxylated Castor Oil

The tendency of these surfaces towards blocking is extremely low; after the application of heat, no fibers adhere to the lacquer surface, even at 190° C.

EXAMPLE 2

A PUR lacquer was prepared from the following ingredients:
  5 parts by weight plasticizer/cellulose nitrate mixture
  15 parts by weight Desmophen 1300 (polyester polyol of Bayer AG, Leverkusen),
  67 parts by weight ethyl acetate
  13 parts by weight Desmodur L (aliphatic polyisocyanate of Bayer AG, Leverkusen).

Figure 2:
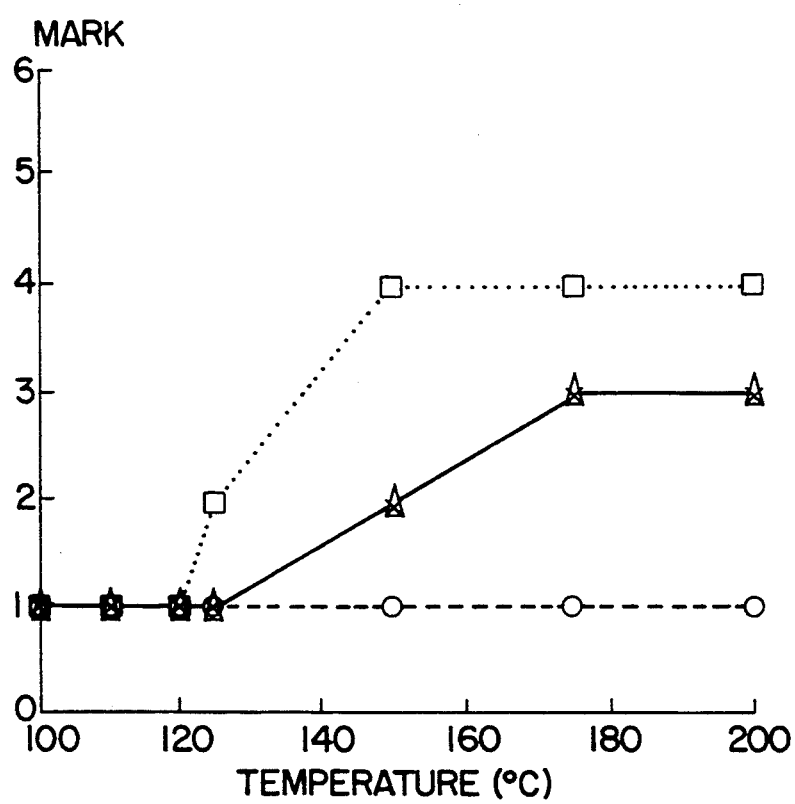

This lacquer was applied to glass plates with a 30 μm box knife coater, aired for 2 h at room temperature, cured for 10 minutes at 180° C. and then subjected to the above-described test at temperatures between 100° and 200° C. The results are shown in FIG. 2.

Dioctyl Phthalate (Comparison)

Beyond 120° C., the surface begins to block, reaching a maximum value beyond 160° C. with a large number of fibers sticking to the surface. The lacquer yellows to a considerable extent.

Epoxidized Soybean Oil

In this case, the lacquer surface only begins to harden at 150° C. The tendency towards blocking reaches a maximum at 175° C. which is distinctly lower than in the case of dioctyl phthalate; only a few fibers stick to the surface. No yellowing occurs in this case.

Epoxidized Linseed Oil

The measured values are identical with those of epoxidized soybean oil. No yellowing occurs in this case.

Ethoxylated Castor Oil

Where this plasticizer/cellulose nitrate mixture is used, there is no change in the lacquer surface up to 200° C.

What is claimed is:

1. A solid lacquer binder consisting essentially of cellulose nitrate having a nitrogen content of less than 12.6% by weight and a component selected from the group consisting of epoxidized esters of natural fatty acids, epoxidized triglycerides, and mixtures thereof.

2. The solid lacquer binder of claim 1, consisting of 82 to 40% by weight cellulose nitrate and 18 to 60% by weight of epoxidized linseed oil.

3. A polyurethane lacquer containing a lacquer binder according to claim 1.

4. A process for the preparation of a lacquer comprising adding thereto to a coating agent a solid lacquer binder consisting essentially of cellulose nitrate having a nitrogen content of less than 12.6% by weight and a component selected from the group consisting of epoxidized esters of natural fatty acids, epoxidized triglycerides, and mixtures of same.

5. A process according to claim 4, wherein the coating agent comprises a polyurethane.

* * * * *